United States Patent [19]

Kleefeldt et al.

[11] Patent Number: 5,744,875
[45] Date of Patent: Apr. 28, 1998

[54] CONTROL SYSTEM FOR A VEHICLE HAVING A MULTIFUNCTIONAL BUTTON FOR A REMOTE CONTROLLER

[75] Inventors: Frank Kleefeldt, Heiligenhaus; Wilfried Ostermann, Essen; Fred Welskopf, Herne, all of Germany

[73] Assignee: Kiekert AG, Heiligenhaus, Germany

[21] Appl. No.: 668,944

[22] Filed: Jun. 24, 1996

[30] Foreign Application Priority Data

Aug. 18, 1995 [DE] Germany ............... 195 30 724.0

[51] Int. Cl.[6] ........................ B60R 25/10
[52] U.S. Cl. ............... 307/10.2; 340/426; 180/287; 307/10.1
[58] Field of Search ............... 307/9.1–10.8; 180/287, 167, 289; 340/425.5, 426, 430, 825.31, 825.32, 825.36, 825.69, 825.72; 364/423.098, 423.099, 424.037, 424.045, 424.054; 123/198 B; 70/262–264, 275, 277–280, 237; 292/201, 336.3, DIG. 3, DIG. 23, DIG. 25; 361/171, 172

[56] References Cited

U.S. PATENT DOCUMENTS

| | | | |
|---|---|---|---|
| 5,248,898 | 9/1993 | Periou | 307/10.1 |
| 5,486,724 | 1/1996 | Periou | 307/10.1 |
| 5,534,846 | 7/1996 | Kuroda | 340/426 |
| 5,583,382 | 12/1996 | Wagner | 307/10.1 |

FOREIGN PATENT DOCUMENTS

| | | |
|---|---|---|
| 39 02 776 | 10/1991 | Germany . |
| 42 27 887 | 1/1994 | Germany . |
| 42 38 858 | 2/1994 | Germany . |

*Primary Examiner*—Jonathan Wysock
*Assistant Examiner*—Peter Ganjian
*Attorney, Agent, or Firm*—Herbert Dubno

[57] ABSTRACT

An electrically-operated system for the locks of a motor vehicle as a remote controller with a multifunction push button which, when first operated, locks the vehicle doors and sets a time window open within which a second actuation of the button will provide the antitheft mode. This arrangement allows a single push button to be used for both locking and antitheft operations.

12 Claims, 2 Drawing Sheets

CONTROL SYSTEM FOR A VEHICLE HAVING A MULTIFUNCTIONAL BUTTON FOR A REMOTE CONTROLLER

FIELD OF THE INVENTION

Our present invention relates to an electrical control system for an automotive vehicle of the type which has a remote controller and which can be used to operate the locks of the vehicle system. The invention also relates to a method of operating such a control system.

BACKGROUND OF THE INVENTION

Electrical control systems have been provided for automotive vehicles and equipped with a remote controller which can communicate with the control system via a wireless communication path, e.g. with infrared light or high-frequency radio waves, the control system operating inter alia the electrically operable vehicle locks.

The vehicle locks can have a locking function or mode as well as antitheft or security function or mode and the remote controller can comprise at least one button for initiating the locking mode and/or the antitheft mode.

The electrical control system can also serve to operate, control or permit the operation of other electrically operable or controllable components of an automotive vehicle. Apart from the vehicle door locks, such components can include interior lighting, vehicle windows, a sun roof, powered seats, the hood or engine compartment closure, a glove compartment closure, fuel tank closures, a theft-warning unit and various other internal and external doors or closures of the vehicle.

It will be understood that each of these components can have, for the purposes of electrical operation or control, appropriate effectors or actuators which, although electrically controlled, may perform the mechanical operations required for closure, latching, locking and the like. The effectors can be electromagnetically operated, e.g. via solenoids or electric motors.

While other systems can be utilized, a highly effective system which has been used for this purpose, allows the transmission of control signals via control lines, e.g. forming a multiplex single-conductor bus, to the various components or groups of components which can be provided with respective satellite processors from a central processor or control unit. In addition to the signal line or bus, whose counterpole can be the vehicle chassis or a common ground for the system, only a connection to an electric source, such as a vehicle battery is required.

When the control signals are transmitted over a multiplex single-conductor bus and the control system includes a central processor which communicates via the bus with one or more satellite processors which can be built into the electrically operated or controlled component of the vehicle, these processors can provide not only the signal differentiation function which is required but the multiplexing function as well.

It will be understood further that a control line can be provided, e.g. the aforementioned bus, which allows sensor signals from sensors, especially position sensors, at one or more components to be transmitted to the central processor. The bus or signal-transmission system to that extent at least can be considered a bidirectional system.

Motor vehicle door locks which have the locked and antitheft modes previously described, also have an opening function or mode and can have any of a number of different constructions. In practice, however, all of the functions can be attained by mechanically positioning of elements of the lock appropriately. When such locks are used with electrical systems of the type with which the invention is concerned, electrical motors or other effectors can be provided to bring about the mechanical operation necessary for the locking and antitheft functions or modes and, of course, the opening function. Such locks may have, therefore, a purely mechanically operating internal locking element and/or an internal opening element. The antitheft mode secures the internal locking element and, optionally as well, an internal opening element against unauthorized operation. Reference may be made in this connection to DE 39 02 776 C2.

With more recently developed vehicle door locks, the opening function is also driven electrically. The locking function can then be electrically controlled simply by inactivation of the actuator which performs the opening function and, in the simplest case by disconnecting the actuator form the electrical supply line, e.g. via a bistable relay. Since such vehicle door locks have a purely mechanically operating internal opening element for safety reasons, the antitheft function is generally brought about by electrical drive of a coupling lever which can selectively be inserted into or removed form the operating or functional chain connected to the internal opening element. Reference in this connection may be had to the commonly assigned copending application Ser. No. 08/653,366 filed Jun. 10, 1996 corresponding to German application 195 30 726.7.

Basically the antitheft or security function can then only be activated after the locking function or mode has been activated or established or simultaneously therewith. Correspondingly, for the deactivation of the antitheft or security function, the locking mode must have been previously activated or can be deactivated simultaneously with the deactivation of the antitheft function.

As noted as well, a remote controller for the electrically operated system usually functions with wireless communication therewith by means of radio waves (HF) or light waves (IR). In the remote controller, control signals, which can be optionally coded, are generated when a push button is actuated and emitted by a transmitter of the remote controller. The control system in the vehicle has a receiver which can be complementary to the transmitter and processes the received signals, optionally with a decoding. Reference may be had to DE 42 27 887 C1 and DE 42 38 858 C1 in this regard.

A control device of the aforedescribed type is generally satisfactory but may require a remote controller with at least functionally distinct two push buttons. One push button serves to initiate the locking function while another button is required to initiate the antitheft function. As a consequence, the user must differentiate between the two functions in selecting the button to be depressed and frequently the user will err since the user may not be conscious of which button is or has been actuated at any point in time. As a consequence, the antitheft mode is frequently in an inactive state after the user leaves the scene of the vehicle. In addition, the need for two buttons increases the possibility of malfunction of the remote controller and increases the size of the unit as well as the cost. The problem is even greater when still other functions are required for the remote controller.

OBJECTS OF THE INVENTION

It is, therefore, the principal object of the present invention to provide an improved control system for a motor vehicle whereby the aforedescribed drawbacks are avoided.

Another object of this invention is to provide an improved electrical control system for a motor vehicle in which the size of the remote controller can be limited, the reliability of the remote controller increased and the probability that the antitheft mode will remain inactive for the vehicle will be reduced by comparison with earlier systems.

Still another object of the invention is to simplify the construction and operation of an electric control system for vehicle door locks and the like.

A still further object of the invention is to provide an improved method of operating an electrical control system for a motor vehicle.

SUMMARY OF THE INVENTION

These objects and others which will become apparent hereinafter are attained, in accordance with the invention by providing a push button of the remote controller which functions as a multifunctional push button for effecting both the locking mode or function of the vehicle door locks as well as the antitheft or security function or mode thereof. According to the invention, with a first actuation of the multifunction button, all of the vehicle door locks are switched into their locked modes and simultaneously a time window $t_1$ is established via a timing circuit, network or component, within which a second actuation of the multifunctional push button will activate the antitheft or security functional mode for all door locks.

The term "multifunction push button" here is intended to refer to a single button by means of which a plurality of functions can be activated or deactivated or modes of the lock can be established or altered. A "reliable" or "secure" actuation of that button is one which is firm rather than casual or accidental.

The invention is based upon the discovery that a differentiation between the locking function or mode and the antitheft or security function or mode can be made in the electronic circuitry whereby, instead of requiring different buttons, a sequential operation of one button can be used. Sequential operation of the push button means that after depression of the multifunction push button to effect a first control function, a second control function is enabled and is carried out by the next activation of the push button.

Of special importance to the invention is the establishment of a time window within which the second activation must occur since the existence of such a time window allows the sequential operation of the push button to carry out a number of functions. In particular, when the multifunction button is actuated within the time window different operations are performed than when the push button is actuated at least subsequently outside the time window, i.e. the control sequence differs when the initial actuation opens the window and the second actuation is within the window than when the second actuation is outside the window.

The multifunction push button can then be used to carry out a multiplicity of control functions, i.e. more than two control functions with a single push button. The use of the time window allows differentiation between the locking function or mode and the antitheft function or mode and permits the push button to be used as well, upon actuation outside the window for some other control function.

The circuitry within the remote controller can be designed to differentiate between control functions or modes when the remote controller emits different types of control signals for a different actuating sequence of the multifunction button.

Of course the differentiation can also be made within the electronics of the control unit itself. In the latter case, the remote controller can emit the identical control signal with each actuation of the multifunction button. The control signal can be varied with a conventional changing code as a function of time if desired. The timing circuit which is used to establish the window can be a discrete timer although it can be formed as part of the remote controller and/or control unit processor. The time window $t_1$ is preferably about three seconds.

According to a feature of the invention, the locked function or mode can be established and the timing circuit operated to open the aforementioned time window with an actuation or depression of the multifunction push button for a duration $t_2$ which is a small fraction of the aforementioned window and is sufficient to ensure that inadvertent or accidental operation of the push button will not be effective. This duration $t_2$ can be a period of say 50 milliseconds or more. For secure second actuation, a corresponding minimum time period is required as well.

According to another feature of the invention, with the second or a further actuation of the multifunction push button within the time window $t_1$, an antitheft warning unit connected to the control unit of the vehicle may be turned on. This warning unit or alarm can signal unauthorized ingress or disturbance of the vehicle.

It has also been found to be advantageous with the second actuation of the multifunction push button within the time window to initiate a closing function for vehicle windows connected to the electrical control system of the vehicle and/or an electrically actuated sun roof thereof. It has been found to be advantageous if, with the second reliable actuation of the multifunction push button within the time window $t_1$, an optical indicator, for example, at an outer door handle of a vehicle lock, is energized. This indicator can be a lamp.

The invention is not limited to the activation of locking and antitheft functions of a vehicle lock. The multifunction push button can also be used for corresponding deactivation. In accordance with this aspect of the invention, where the vehicle door locks are in their locked and/or antitheft securing modes, a reliable actuation of the multifunction push button can deactivate the locking function of all of the vehicle door locks. Simultaneously, any antitheft function which has been activated will be deactivated. The deactivation is effected by actuation of the multifunction push button outside the time window $t_1$. With the locked and/or antitheft mode established for the vehicle lock, a first reliable actuation of the multifunction push button will result in deactivation of the locked function or mode for the driver's door lock and deactivation of the antitheft function of the further door locks and simultaneously the establishment of a time window $t_3$ during which a second reliable actuation of the multifunction push button within the window $t_3$ will unlock the further door locks. The further door locks can include those of the passenger door and rear door locks. With the actuation of the drivers door lock with the first actuation operation of the multifunction push button, the fuel tank cover, motor hood and/or glove compartment can be unlocked, if not released, although generally the trunk lock will not be unlocked. With the second actuation of the push button, all elements remaining locked from the prior actuation can be unlocked. When the control unit has an antitheft warning system or alarm, it is deactivated by the initial actuation of the multifunction switch.

The locking function can only be activated according to the invention when sensors indicate that the vehicle doors and the trunk cover are closed and the ignition is off, the sensors being connected to the control unit for this purpose.

The fact that a multifunction push button controls both the locking mode and the antitheft mode of the control system also allows other control functions to be integrated in the remote controller. For example, a window lifter button can be additionally provided which allows vehicle windows to be brought into the closed position.

This push button can also have a multiplicity of functions in that, with the vehicle windows closed, a depression of the window lifter button will open, for example, the driver's side door window of the vehicle. Since this latter function should not be carried out while the antitheft function is active, it may require disconnection of the antitheft function prior to window opening. The window lifter button can be multifunctional in that sensors at the window lifters can signal their positions and these signals can be applied to the control unit. To that extent a differentiation is provided in the electronics of the control unit. The two functions of the window lifter button determines the dilution of the command to the extent that the vehicle window must be opened or closed.

The control system of the invention thus can comprise:

a control unit on the vehicle connected to the door locks for operating same;

a remote controller for the system in wireless communication with the control unit and having at least one multifunction button for switching the door locks into both the locked mode and the antitheft mode; and circuitry including a timing element in at least one of the control unit and the remote controller for switching all of the door locks upon an initial actuation of the pushbutton with the door locks in the unlocked mode into the locked mode and simultaneously establishing a time window $t_1$ with the timing element, and upon a subsequent actuation of the pushbutton within the time window switching all of the door locks into the antitheft mode.

The method of the invention can comprise:

with the door locks in an unlocked mode, initially actuating the pushbutton to switching all of the door locks into the locked mode and simultaneously establish a time window $t_1$; and during the time window, effecting a subsequent actuation of the pushbutton to switching all of the door locks into the antitheft mode.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
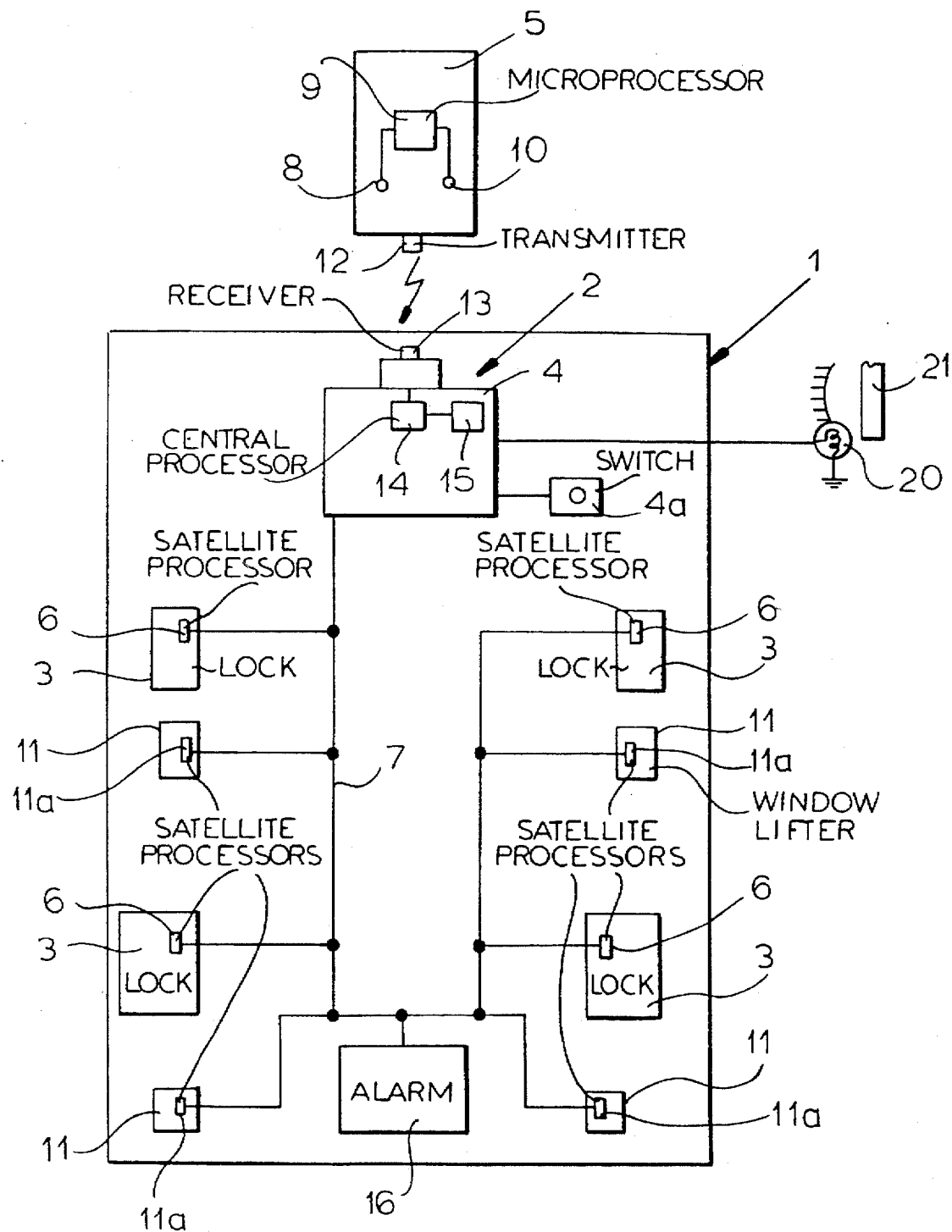
FIG. 1 is a schematic diagram, partly in block form, of a control system according to the invention.

As can be seen from FIG. 1, a motor vehicle represented generally by the box 1 and which can have a chassis ground comprises a control unit 2 for the control and operation of a number of vehicle door locks 3. The control unit 2 can have a central controller 4, e.g. a central processor, and a remote controller 5 which can communicate in a wireless manner with the central controller 4. Each of the door locks 3 can have a satellite processor and communication between the central processor 4 and the satellite processors 6 can be effected by a multiplex single-conductor bus represented generally at 7.

Each of the locks 3 may have both a locking function or mode and an antitheft or securing function or mode as has previously been described but has not been illustrated. Also not shown in any detail are switches such as the switch 4a which can be used to actuate the door locks within the vehicle.

To control the locks 3 via the remote controller 5, the latter is provided with circuitry 9 which can include a microprocessor, provided with a window-lift button 10 for actuating the windows of the vehicle.

For that purpose, the system 2 may have window lifters 11 whose satellite processors 11a may be connected to the bus 7. Thus, when the push button 10 is actuated, the windows 11 can be operated.

The remote controller 5, for this purpose, has a transmitter represented at 12 which is in wireless communication, e.g. via infrared light or radio waves, with the complementary receiver 13 of the control unit 4 whose central processor is represented at 14 and is connected to a timing circuit or switch 15.

The vehicle 1 also has a theft warning system represented as the alarm 16. The theft warning system 16 may have a further processor connected to the multiplex single-conductor bus and by the latter with the control unit 4.

The functioning of the system can be described with reference to the timing diagrams of FIGS. 2a–2c and FIGS. 3a–3c. In all of these Figures, time is represented along the abscissa and along the ordinate, the functional state is plotted as "active" (1) or "inactive" (0).

Figure 2A:
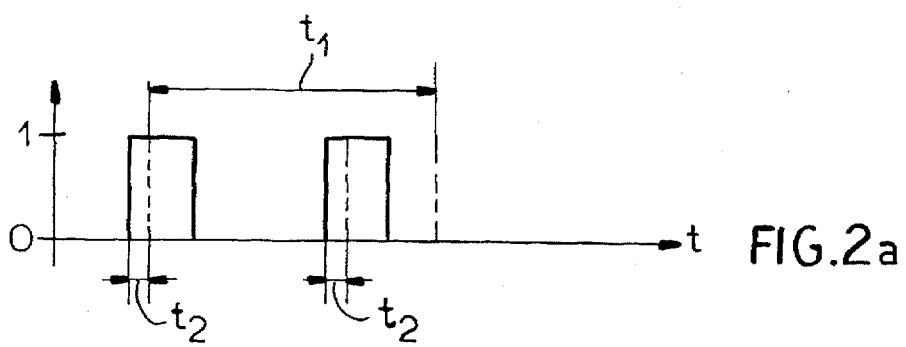
FIG. 2a–FIG. 2c, are diagrams showing the operations of the push button within the time window $t_1$.
Figure 3A:
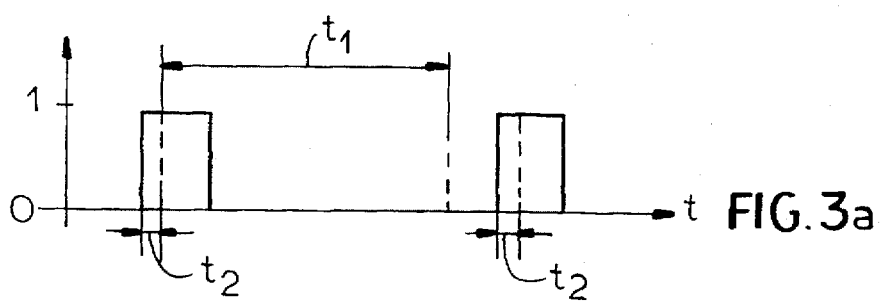
FIG. 3a–FIG. 3c are diagrams relating to the actuation of the push button outside the time window $t_1$.

FIGS. 2a and 3a show the function of the multifunction push button 8 of the remote controller 5, this push button being connected to the microprocessor circuitry 9.

Figure 2B:
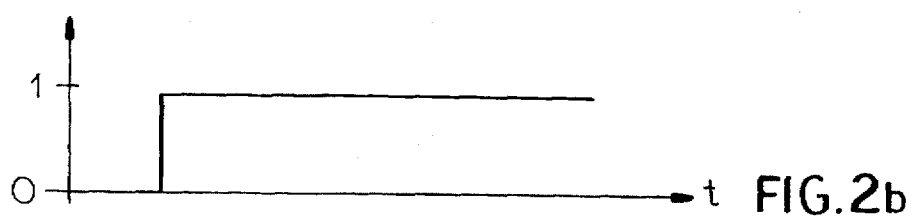
Figure 2C:
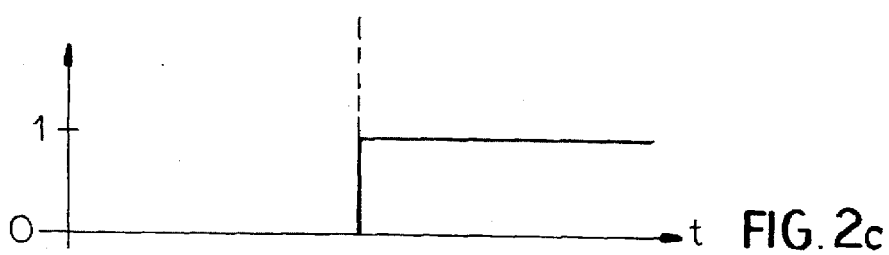
Figure 3B:
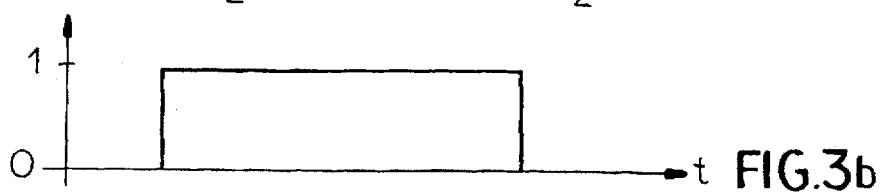
Figure 3C:

FIGS. 2b and 3b represent the locked function or mode and FIGS. 2c and 3c represent the antitheft securing function or mode.

As a comparison of FIGS. 2a and 2b or 3a and 3b will show, when the door locks 3 are in their unlocked mode or state, an initial reliable depression of the multifunction push button 8 will simultaneously initiate the locking function of all door locks 3 and simultaneously actuate the timing circuit 15 for the multifunction push button 8 to establish a time window $t_1$. As is also apparent from FIGS. 2a and 2b, both the locking function and the opening of the time window $t_1$ is only effected when the push button 8 is depressed for at least a duration $t_2$.

A comparison of FIGS. 2a–2c also shows that only upon a second reliable actuation of the multifunctional switch 8 during the time window $t_1$ for a time interval of at least $t_2$ will initiate the antitheft mode (FIG. 2c). With this second actuation of the button 8, the window lifters 11 are actuated to close all of the vehicle windows which are open and the antitheft alarm 16 is placed in its readiness or "on" condition. In addition, the second actuation of the push button 8 can also initiate the optical signal function by illuminating a lamp 20 proximal to an outer door handle 21 of the vehicle.

By contrast, as a comparison of FIGS. 3a–3c will show, a second actuation of the push button 8 outside the time window $t_1$, even for a period of at least $t_2$, will not activate the antitheft securing mode. Rather, it will deactivate the locking function or mode. Thus a second reliable depression of push button 8 will represent an unlocking actuation. Of course, if the door locks 3 are in their antitheft mode, the unlocking actuation of the multifunction button 8 will also release the antitheft function for all door locks and additionally deactivate the antitheft alarm 16.

We have mentioned that in the locked and/or antitheft modes of the door locks, a depression of the multifunction push button 8 will deactivate the locking function of all of the vehicle doors or initially unlock only the driver's side door and the antitheft functions for all of the doors, establishing another time window $t_3$ within which a further actuation of the push button 8 will allow the remaining doors to be unlocked. The selection between these two modes can be afforded by a tachenstric device or programming unit which can be connected to the control unit 4 via an appropriate terminal or by providing a selector switch in the remote controller 5 or a jumper or the like in the remote controller. Of course in that case an additional timing circuit is required for the time window $t_3$.

We claim:

1. An electrical control system for an automotive vehicle having electrically operated door locks each with a locked mode, an unlocked mode and an antitheft mode, said system comprising:

a control unit on said vehicle connected to said door locks for operating same;

a remote controller for said system in wireless communication cation with said control unit and having at least one multifunction button issuing different control signals for switching said door locks into both said locked mode and said antitheft mode in response to different actuation sequences of said multifunction button;

circuitry including a timing element in at least one of said control unit and said remote controller for switching all of said door locks upon an initial actuation of said pushbutton with said door locks in said unlocked mode into said locked mode and simultaneously establishing a time window $t_1$ with said timing element, and upon a subsequent actuation of said pushbutton within said time window switching all of said door locks into said antitheft mode;

at least one electrically operated window additional unit in the form of a window or a sliding sunroof on the vehicle connected to said control unit and activated by an actuation of said multifunction pushbutton within said time window $t_1$ to close said additional unit; and at least one electrically operated indicator on the vehicle connected to said control unit and activated by an actuation of said multifunction pushbutton within said time window $t_1$.

2. The electrical control system defined in claim 1 wherein the locked mode and the operation of said timing element are effected by initial actuation of said multifunction pushbutton for a time interval of at least $t_2$.

3. The electrical control system defined in claim 1, further comprising a theft warning unit connected to said control unit and activated by an actuation of said multifunction pushbutton within said time window $t_1$.

4. The electrical control system defined in claim 1 wherein said indicator is light element operated by said control unit and provided on an exterior door handle of the vehicle.

5. The electrical control system defined in claim 1 wherein said circuitry upon a release actuation of said multifunction pushbutton in a locked or antitheft mode of said locks, deactivates the locked mode thereof.

6. The electrical control system defined in claim 5, further comprising a theft warning unit connected to said control unit and deactivated by said release actuation of said multifunction pushbutton.

7. The electrical control system defined in claim 1 wherein said circuitry upon an initial release actuation of said multifunction pushbutton in a locked or antitheft mode of said locks, deactivates the locked mode and the antitheft mode of a driver door lock and simultaneously initiates a time window $t_3$ within which subsequent release actuation of said multifunction pushbutton deactivates the locked mode of the other door locks.

8. The electrical control system defined in claim 7, further comprising a theft warning unit connected to said control unit and deactivated by said initial release actuation of said multifunction pushbutton.

9. A method of operating an electrical control system for an automotive vehicle having electrically operated door locks each with a locked mode, an unlocked mode and an antitheft mode, at least one electrically-operated window, an electrically-operated sliding sunroof, and an optical indicator, said system having a control unit on said vehicle connected to said door locks for operating same and a remote controller for said system in wireless communication with said control unit and having at least one multifunction button issuing different control signals for switching said door locks into both said locked mode and said antitheft mode in response to different actuation sequences of said multifunction button, said method comprising:

with said door locks in an unlocked mode, initially actuating said multifunction button with one sequence to switching all of said door locks into said locked mode and simultaneously establish a time window $t_1$;

during said time window, effecting a subsequent actuation of said multifunction button with another sequence to switch all of said door locks into said antitheft mode;

activating said electrically operated window to close the same by said subsequent actuation of said multifunction button within said time window $t_1$;

activating said sunroof to close the same by said subsequent actuation of said multifunction button within said time window $t_1$; and activating said indicator by said subsequent actuation of said multifunction button within said time window $t_1$.

10. The method defined in claim 9 wherein the locked mode and the establishment of said time window $t_1$ are effected by the initial actuation of said multifunction button for a time interval of at least $t_2$.

11. The method defined in claim 10 wherein a theft warning unit is connected to said control unit, the method further comprising activating said theft warning unit by said subsequent actuation of said multifunction button within said time window $t_1$.

12. The method defined in claim 11, further comprising effecting a release actuation of said multifunction button in a locked or antitheft mode of said locks to deactivate the locked mode thereof.

* * * * *